United States Patent
Kim et al.

(10) Patent No.: US 8,649,312 B2
(45) Date of Patent: Feb. 11, 2014

(54) METHOD AND APPARATUS FOR COUNTING MULTIMEDIA BROADCAST AND MULTICAST SERVICES

(75) Inventors: Dae Ik Kim, Daejeon (KR); Jee Hyeon Na, Daejeon (KR); Jung Mo Moon, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 78 days.

(21) Appl. No.: 13/330,629

(22) Filed: Dec. 19, 2011

(65) Prior Publication Data

US 2012/0155364 A1   Jun. 21, 2012

(30) Foreign Application Priority Data

Dec. 21, 2010 (KR) .......................... 10-2010-0131431

(51) Int. Cl.
*H04H 20/71* (2008.01)
*G06F 11/00* (2006.01)

(52) U.S. Cl.
USPC .......................................... 370/312; 370/252

(58) Field of Classification Search
None
See application file for complete search history.

(56) References Cited

U.S. PATENT DOCUMENTS

| | | | | |
|---|---|---|---|---|
| 7,535,882 B2* | 5/2009 | Kim | ............................... | 370/338 |
| 8,228,852 B2* | 7/2012 | Yi et al. | ........................ | 370/329 |
| 2005/0213583 A1* | 9/2005 | Lee et al. | ................... | 370/395.5 |
| 2006/0034225 A1* | 2/2006 | Jung et al. | ...................... | 370/331 |
| 2007/0070972 A1* | 3/2007 | Wang et al. | .................. | 370/349 |
| 2010/0061247 A1* | 3/2010 | He | ............................... | 370/241 |
| 2010/0142429 A1* | 6/2010 | Yi et al. | ........................ | 370/312 |
| 2010/0329167 A1* | 12/2010 | Linden et al. | ................ | 370/312 |
| 2011/0019604 A1* | 1/2011 | Chun et al. | ................... | 370/312 |
| 2011/0044274 A1* | 2/2011 | Lee et al. | ...................... | 370/329 |
| 2011/0194428 A1* | 8/2011 | Wang et al. | .................. | 370/252 |
| 2011/0211516 A1* | 9/2011 | Yi et al. | ........................ | 370/312 |
| 2011/0249608 A1* | 10/2011 | Fischer | ........................ | 370/312 |
| 2011/0305183 A1* | 12/2011 | Hsu et al. | ...................... | 370/312 |
| 2012/0213142 A1* | 8/2012 | Van Lieshout et al. | ....... | 370/312 |
| 2013/0051305 A1* | 2/2013 | Kuo | ............................... | 370/312 |
| 2013/0070660 A1* | 3/2013 | Xu | ............................... | 370/312 |
| 2013/0107773 A1* | 5/2013 | Chang | .......................... | 370/311 |

FOREIGN PATENT DOCUMENTS

KR   1020090016435   2/2009
KR   1020090017995   2/2009

* cited by examiner

*Primary Examiner* — Warner Wong
(74) *Attorney, Agent, or Firm* — Nelson Mullins Riley & Scarborough LLP; Anthony A. Laurentano

(57) ABSTRACT

A method and apparatus for multimedia broadcast and multicast service (MBMS) counting is provided. A user equipment (UE) may transmit selected service information to a multi-cell and multicast coordination entity (MCE) through a target evolved node base station (eNB), every time that a service requiring counting is received or cancelled and thus, the MCE may accurately manage a number of UEs that receive a service for each eNB. Also, the use may transmit selected service information to the MCE through the target eNB every time that the UE enters a new cell and thus, the MCE may accurately manage a number of UEs that receive a service for each eNB.

5 Claims, 5 Drawing Sheets

METHOD AND APPARATUS FOR COUNTING MULTIMEDIA BROADCAST AND MULTICAST SERVICES

CROSS-REFERENCE TO RELATED APPLICATION

This application claims the benefit of Korean Patent Application No. 10-2010-0131431, filed on Dec. 21, 2010, in the Korean Intellectual Property Office, the disclosure of which is incorporated herein by reference.

BACKGROUND

1. Field of the Invention

The present invention relates to a method and apparatus for multimedia broadcast and multicast service (MBMS) counting in a multimedia broadcast and multicast service single frequency network (MBSFN).

2. Description of the Related Art

A long term evolution-advanced (LTE-advanced) system standard defines a multimedia broadcast and multicast service single frequency network (MBSFN) to provide a broadcasting service through a communication network.

The MBSFN refers to a technology that simultaneously transmits the same data, at the same time, by synchronizing radio resources in all E-UTRAN NodeBs (eNBs) included in an MBSFN area. A signal from a neighboring eNB may be a gain to a user equipment (UE), as opposed to being interference, when the MBSFN technology is utilized.

Therefore, in the MBSFN area, the UE may recognize MBMS data transmitted from all eNBs as MBMS data transmitted from a single eNB. In the MBSFN area, although the UE moves, a broadcasting service may be continuously provided without an additional handover process.

An MBSFN-based MBMS service may provide a broadcast and multicast service.

The broadcast service may refer to a service provided over a network, unilaterally. When the broadcast service is provided, the UE may selectively receive a service irrespective of a connection state of a radio resource control (RRC). Therefore, a number of UEs receiving services from a particular eNB may be difficult to be recognized, currently, in a network.

Also, to receive a multicast service, the UE may need to join a multicast service group while the UE is in a radio resource control (RRC)-connected state. Therefore, at the time when the UE joins the multicast service group, counting information associated with a corresponding service may be recognized. However, when the UE moves to a new cell while in an RRC-idle state, it is difficult to maintain the counting information associated with a corresponding eNB, accurately.

When MBMS counting is not accurately performed with respect to the MBMS service, the eNB may continuously provide a service that the UE does not actually receive. Therefore, wireless resources may be wasted.

A wideband code division multiple access (WCDMA) system may solve the drawback by transmitting an MBMS access information message. That is, the WCDMA system may transmit an MBMS access information message to be used for MBMS counting in addition to an MBMS traffic information message, for a single-cell-based MBMS service as opposed to for the MBSFN-based MBMS service. The MBMS access information message may be transmitted via an MBMS control channel (MCCH).

When the MBMS counting is performed based on the MBMS access information, the UE may provide a response within a predetermined time. Therefore, a network load may increase, and performing the MBMS counting may in real time be difficult.

As described in the foregoing, the MBMS counting may not be applicable to the MBSFN-based MBMS service.

Therefore, there is a desire for a method that minimizes a waste of wireless resources by providing accurate MBMS counting information to a network, irrespective of the RRC connection state of the UE and a movement of the UE to a new cell when the MBSFN-based MBMS service is provided in the LTE-advanced system.

SUMMARY

An aspect of the present invention provides a method and apparatus for accurately managing a number of user equipments (UEs) that receive a service for each E_UTRAN NodeB (eNB), by transmitting information associated with a selected service to a multi-cell and multicast coordination entity (MCE) through a target eNB, every time that a UE receives or cancels a service requiring counting.

Another aspect of the present invention also provides a method and apparatus for accurately managing a number of UEs that receive a service for each eNB, by transmitting information associated with a selected service to an MCE through a target eNB, every time a UE accesses a new cell.

According to an aspect of the present invention, there is provided a method of a UE for providing, to a base station, multimedia broadcast and multicast service (MBMS) counting information, the method including receiving, from the base station, a multimedia broadcast and multicast service single frequency network (MBSFN) area configuration message, changing MBMS selected services information during a radio resource control (RRC)-connected state, by selecting or terminating a first service requiring MBMS counting, transmitting, to the base station, an MBMS modification request message including a first list of selected services and a second list of terminated services, changing an RRC connection state from the RRC-connected state to an RRC-idle state, changing the MBMS selected services information during the RRC-idle state, by selecting or terminating a second service requiring MBMS counting, and transmitting, to the base station, an RRC connection request message including a third list of selected services and a fourth list of terminated services.

The MBSFN area configuration message may be a message of a multicast control channel, the MBMS modification request message may be a message of a dedicated control channel (DCCH), and the RRC connection request message may be a message of a common control channel (CCCH).

The RRC connection request message may set a cause for establishment as reception of an MBMS.

The first service requiring the MBMS counting and the second service requiring the MBMS counting may be identified based on the MBSFN area configuration message.

The first list, the second list, the third list, and the fourth list may be included in the MBMS selected services information, and transmitted.

According to another aspect of the present invention, there is provided an MBMS counting method in a long-term evolution (LTE)-advanced system including an eNB and a multi-cell and a multicast coordination entity (MCE), the method including receiving, by the eNB from a first UE, an MBMS modification request message including first MBMS selected services information, transmitting, by the eNB to the MCE, a first MBMS selected services information message including the first MBMS selected services information, increasing and decreasing, by the MCE, counting information associated with second UEs that receive a predetermined service from the eNB, based on the first MBMS selected services information, receiving, by the eNB from the first UE, an RRC connection request message including second MBMS selected services information, transmitting, by the eNB to the MCE, a second MBMS selected services information message including the second MBMS selected services information, and increasing and decreasing, by the MCE, counting information associated with the second UEs that receive the predetermined service from the eNB, based on the first MBMS selected services information.

The method may further include transmitting, by the MCE to the eNB, an MBMS scheduling information message, transmitting, by the eNB to the MCE, an MBMS scheduling information response message, and transmitting, by the eNB to a UE in the LTE-advanced system, a multimedia broadcast and multicast service single frequency network (MBSFN) area configuration message.

When the MBMS scheduling information message is associated with the predetermined service requiring MBMS counting, the MBMS scheduling information message and the MBSFN area configuration message may include an MBMS counting indicator.

The transmitting of the MBSFN area configuration message may be repeatedly performed based on a multicast control channel modification period.

The MBMS scheduling information message may include wireless resource allocation information and service information of an MBMS session being serviced.

The method may further include controlling, by the MCE, whether to continuously provide the predetermined service based on the counting information associated with second UEs.

The method may further include controlling, by the MCE, point-to-point transmission switching of the predetermined service based on the counting information associated with the second UEs.

According to still another aspect of the present invention, there is provided an MBMS counting method in an LTE-advanced system including a first eNB, a second eNB, and an MCE, the method including receiving, by the first eNB from a first UE that accesses a cell of the first eNB, an RRC connection request message including a first MBMS selected services information and a second eNB indicator, transmitting, by the first eNB to the MCE, a first MBMS selected services information message including the first MBMS selected services information, and decreasing, by the MCE, counting information of the first eNB and increasing, by the MCE, counting information of the second eNB, based on the first MBMS selected services information.

The method may further include receiving, by the second eNB from a second UE, a handover completion message including second MBMS selected services information and a first eNB indicator, a connection being set between the second eNB and the second UE, transmitting, by the second eNB to the MCE, a second MBMS selected services information message including the second MBMS selected services information, and decreasing, by the MCE, counting information of the first eNB, and increasing, by the MCE, counting information of the second eNB, based on the second MBMS selected services information.

The method may further include transmitting, by the first eNB to the second UE, a DCCH handover command message.

The method may further include converting, by the MCE based on the counting information of the first eNB and the counting information of the second eNB, a cell that does not include a UE that receives an MBMS service from an MBMS reserved cell.

The method may further include changing, by the cell converted to the MBMS reserved cell, a service being provided by the cell.

Additional aspects, features, and/or advantages of the invention will be set forth in part in the description which follows and, in part, will be apparent from the description, or may be learned by practice of the invention.

EFFECT

Exemplary embodiments may provide a method and apparatus for accurately managing a number of user equipments (UEs) that receive a service for each evolved node base station eNB, by transmitting information associated with a selected service to a multi-cell and multicast coordination entity (MCE) through a target eNB every time a UE receives or cancels a service requiring counting.

Exemplary embodiments may provide a method and apparatus for accurately managing a number of UEs that receive a service for each eNB, by transmitting information associated with a selected service to an MCE through a target eNB every time a UE accesses a new cell.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
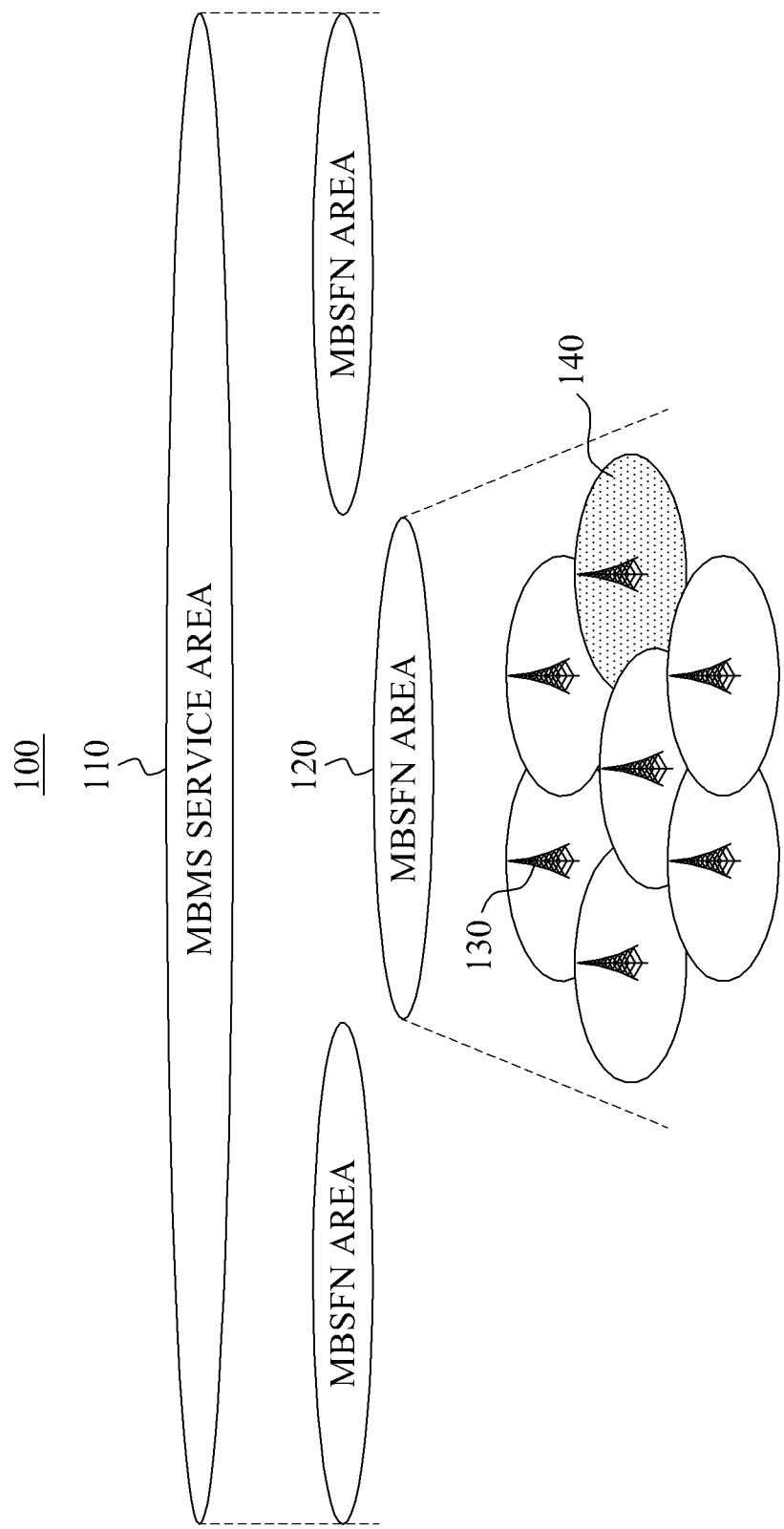
FIG. 1 is a diagram illustrating provision of a multimedia broadcast and multicast service single frequency network (MBSFN)-based multimedia broadcast and multicast service (MBMS) service in a long term evolution (LTE)-advanced system according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Throughout the specifications, changing of information may include changing of partial information.

FIG. 1 illustrates provision of a multimedia broadcast and multicast service single frequency network (MBSFN)-based multimedia broadcast and multicast service (MBMS) service in a long term evolution (LTE)-advanced system 100 according to an embodiment of the present invention.

The LTE-advanced system 100 may include an MBMS service area 110.

The MBMS service area 110 may include at least one MBSFN area 120

In a single MBSFN area 120, all eNBs 130 may synchronize radio resources and may simultaneously transmit the same data at the same time.

Accordingly, even when a user equipment (UE) exists in a boundary between cells, a signal from a neighboring evolved node base station eNB may be a gain to the UE, as opposed to being interference.

Therefore, although the all eNBs 130 transmit MBMS data in the MBSFN area 120, the UE may recognize that the UE receives data transmitted from a single eNB. In the area, the UE may receive a service irrespective of a radio resource control (RRC) connection state, and the UE may continuously receive a broadcasting service without an additional handover process although the UE moves.

An eNB 130 in the MBSFN area 120 may be an MBMS reserved cell 140. The MBMS reserved cell 140 may be included in the MBSFN area 120, and may not participate in MBMS transmission. The MBMS reserved cell 140 may provide another service with a limited power within a scope that does not affect an MBMS service.

The MBMS reserved cell 140 may be determined based on a cell design. Also, when a UE that receives an MBMS service does not exist in a corresponding cell as a result of MBMS counting, the corresponding cell may be dynamically converted to the MBMS reserved cell 140.

The eNB 130 that participates in the MBMS area 120 may not use, for the MBMS transmission, a wireless resource allocated to a predetermined service based on the result of the MBMS counting, and may provide another service within a scope that does not affect the MBMS service.

Figure 2:
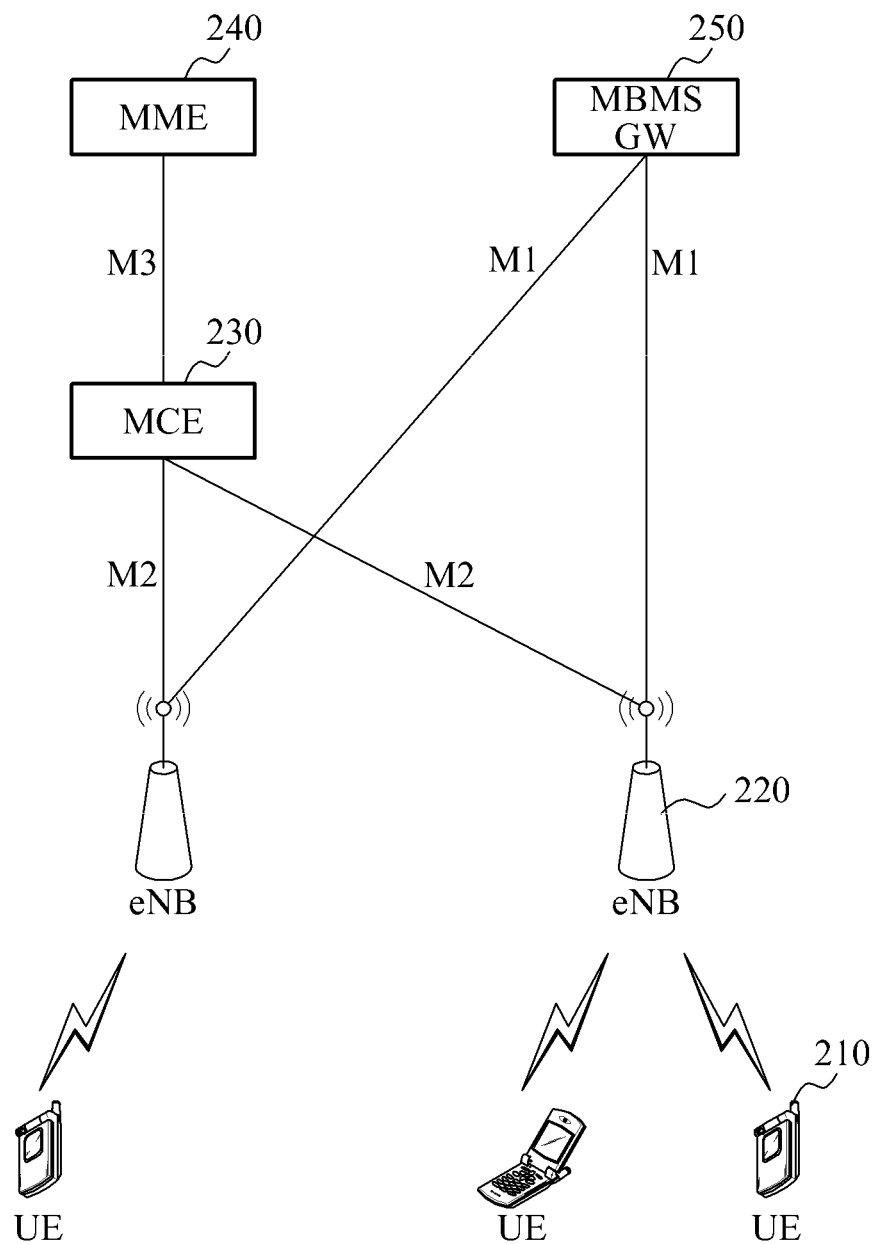
FIG. 2 is a diagram illustrating a logical structure of an MBMS in an LTE-advanced system according to an embodiment of the present invention.

FIG. 2 illustrates a logical structure of an MBMS in an LTE-advanced system according to an embodiment of the present invention.

A UE 210 may be connected with an eNB 220, wirelessly. The UE 210 may receive, from the eNB 220, a multicast control channel (MCCH) message corresponding to MBMS control information. The MCCH message may include an MBMS service list.

The UE 210 may receive an MBMS service by selecting or cancelling the MBMS service based on the MBMS control information, and may receive an MBMS service irrespective of an RRC connection state with the eNB 220, for example, an RRC-connected state or an RRC-idle state, and movement of the UE 210.

The eNB 220 may wirelessly transmit MBMS traffic received from an MBMS gateway (GW) 250, based on information associated with resource control and information associated with a start and end of an MBMS service provided from a multi-cell and multicast coordination entity (MCE) 230

The eNB 220 may communicate with the MCE 230 through an M2 interface, and may communicate with the MBMS GW 250 through an M1 interface.

The MCE 230 may refer to a multi-cell and multicast coordination entity.

The MCE 230 may perform admission control and allocation of a wireless resource with respect to all eNBs 220 included in the MBSFN area 120.

For example, the MCE 230 may not allocate a wireless bearer to the eNB 220 when a wireless resource for an MBMS service is insufficient.

The MCE 230 may allocate a time wireless resource and a frequency wireless resource for the allocated wireless bearer, and may control all wireless resources allocated to the wireless bearer, including a modulation and code scheme.

The MBMS GW 250 between a broadcast and multicast service center (BMSC) and the eNB 220, may transmit MBMS traffic to the all eNBs 220. The transmission may be performed through internet protocol (IP) multicast.

A mobility management entity (MME) 240 may perform MBMS session control. The MME 240 may communicate with the MCE 230 through an M3 interface.

Figure 3:
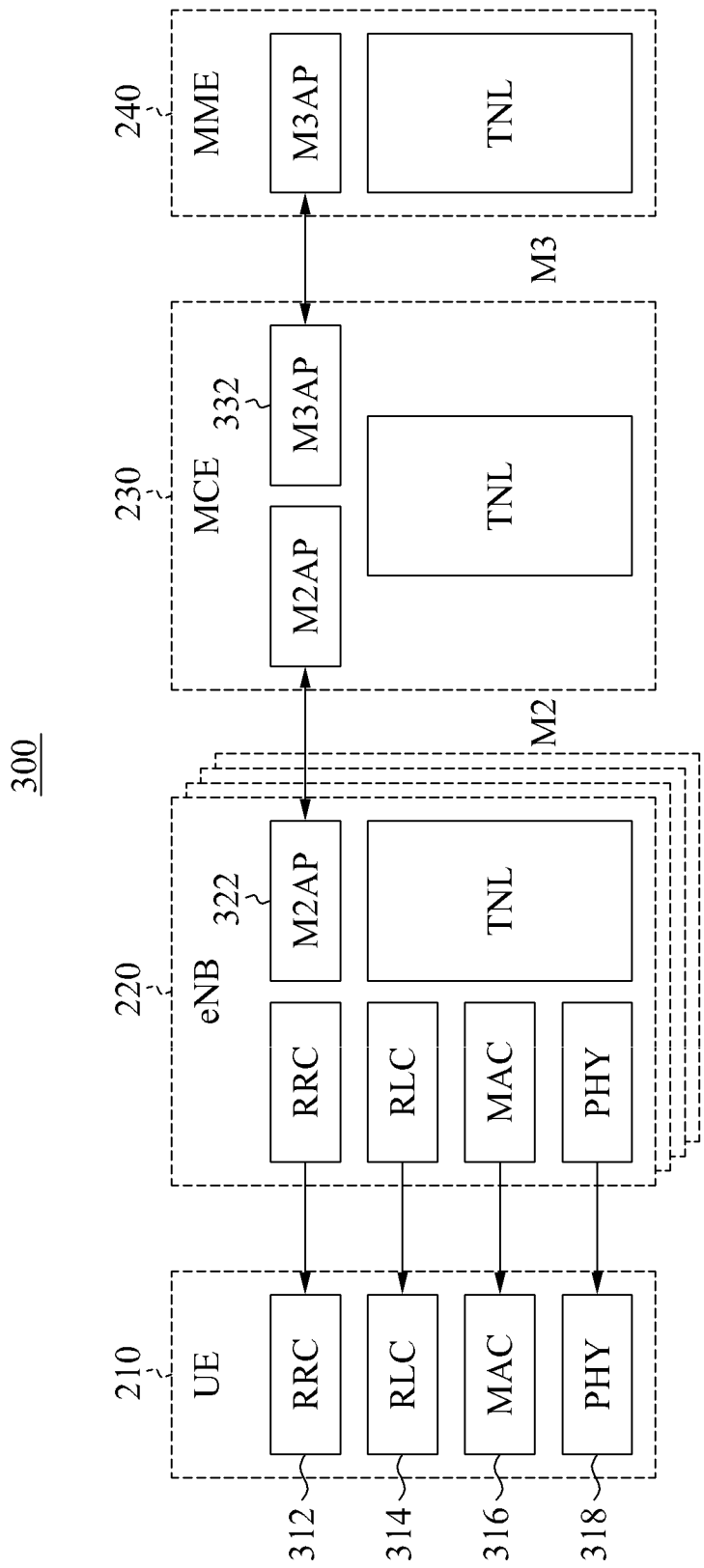
FIG. 3 is a diagram illustrating a configuration of a control plane of an MBMS according to an embodiment of the present invention.

FIG. 3 illustrates a configuration of a control plane of an MBMS according to an embodiment of the present invention.

An M3 interface may perform communication between the MME 240 and the MCE 230, based on an M3AP 332. The M3 interface may be a signal interface for MBMS session control, such as a start and an end of an MBMS session.

An M2 interface may perform communication between the MCE 230 and the eNB 220, based on an M2AP 322. The M2 interface may be a signal interface for MBMS session control and eNB wireless resource control.

An interface between the UE 210 and the eNB 220 may include an RRC 312 corresponding to a layer 3, a radio link control (RLC) 314 corresponding to a layer 2, and a medium access control (MAC) 316 corresponding to the layer 2, and a physical layer (PHY) 318 corresponding to a layer 1.

The RRC 312 may perform system information control, paging, managing of RRC connection, control of a dedicated wireless bearer, mobility control, MBMS control, and the like.

The RLC 314 may perform transmission of an upper layer packet data unit (PDU), connection, division, and reassembly of an RLC service data unit (SDU), and the like.

The MAC 316 may perform mapping of a logical channel and a transmission channel, multiplexing and demultiplexing of an MAC SDU, synchronous scheduling, and the like.

The PHY 318 may perform link adaptation, power control, and cell searching, and the like.

Figure 4:
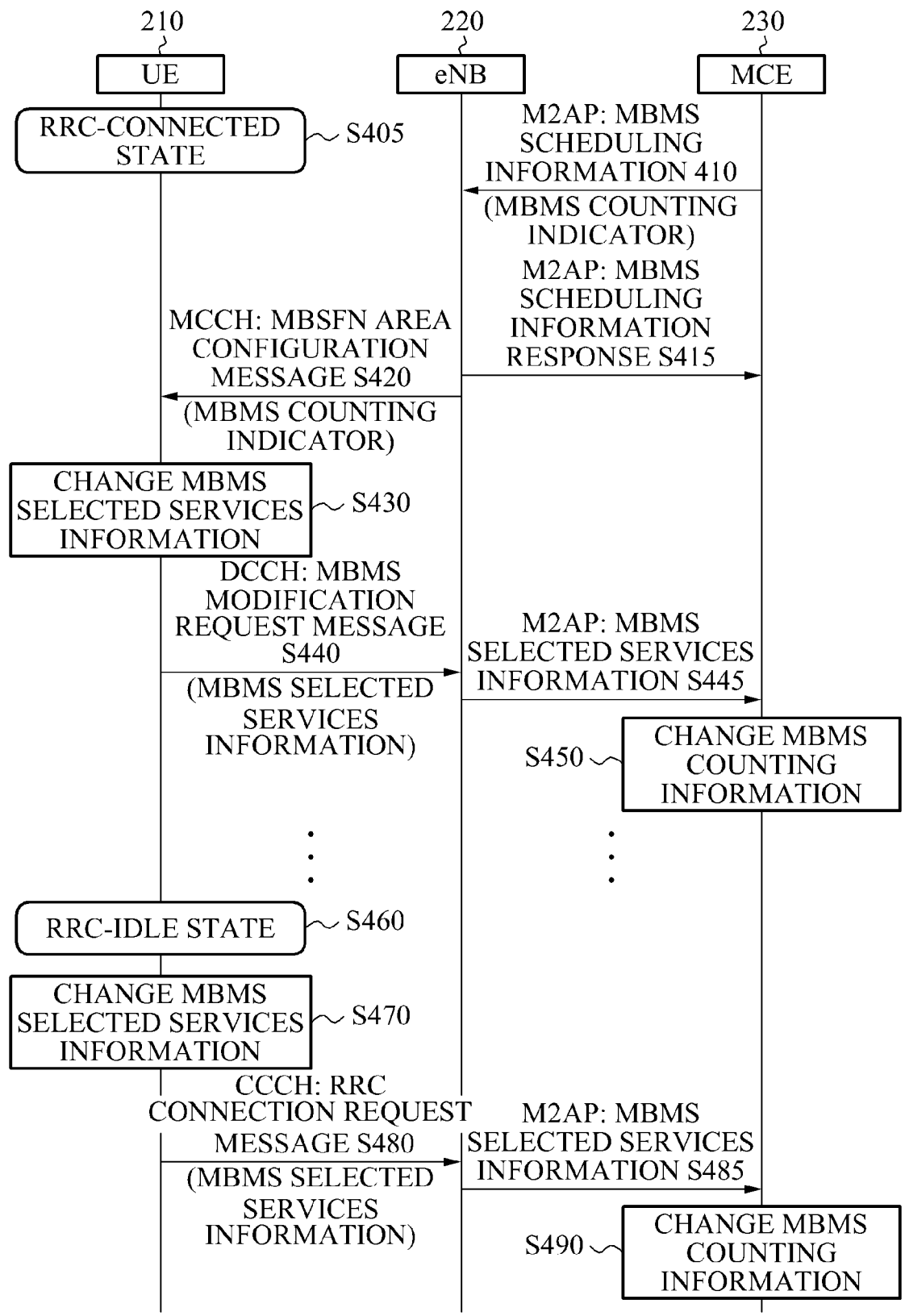
FIG. 4 is a flowchart illustrating an MBMS counting method based on a radio resource control (RRC) connection state of a user equipment (UE) according to an embodiment of the present invention.

FIG. 4 illustrates an MBMS counting method based on an RRC connection state of the UE 210 according to an embodiment of the present invention.

The MCE 230 may be a start and an end of an MBMS session.

In operation S405, an RRC connection state of the UE 210 may be an RRC-connected state.

In operation S410, when MBMS scheduling information is changed, the MCE 230 may transmit an MBMS scheduling information message to all eNBs 220 in an MBSFN area 120, through an M2AP 322.

In operation S415, the MCE 230 may receive an MBMS scheduling information response message from the eNBs 220, in response to the MBMS scheduling information message.

When the MBMS scheduling information message is associated with a service requiring MBMS counting, the MCE 230 may transmit the MBMS scheduling information message by adding an MBMS counting indicator in the MBMS scheduling information message. That is, the MBMS scheduling information message may include the MBMS counting indicator.

The MBMS scheduling information message may include wireless resource allocation information and service information associated with an MBMS session that is currently being serviced.

In operation S420, the eNB 220 may transmit an MBSFN area configuration message of the MCCH to the UE 210, in a next multicast control channel (MCCH) modification period. The MBSFN area configuration message may include an MBMS counting indicator.

The eNB 220 may repeatedly transmit the MBSFN area configuration message based on an MCCH repetition period.

The UE 210 that is receiving the MBMS or is interested in receiving the MBMS may receive the MBSFN area configuration message. The UE 210 may selectively receive an MBMS service by receiving the MBSFN area configuration message. The UE 210 may identify a service requiring MBMS counting, based on the MBSFN area configuration message or based on the MBSFN area configuration message including the MBMS counting indicator, without receiving an additional message.

In operation S430, the UE 210 of which an RRC connection state is an RRC-connected state may select or terminate a service requiring an MBMS counting. Therefore, the UE 210 of which the RRC connection state is the RRC-connected state may change MBMS selected services information by selecting or terminating the service requiring the MBMS counting. The information associated with the MBMS selected services may include information associated with MBMS services selected or cancelled by the UE 210.

In operation S440, the UE 210 may transmit, to the eNB 220, an MBMS modification request of a dedicated control channel (DCCH). The eNB 220 may receive the MBMS modification request message.

The MBMS modification request message may include a list of services selected by the UE 210 and a list of services terminated by the UE 210.

The MBMS modification request message may include the changed MBMS selected services information, and the changed MBMS selected services information may include a list of services selected by the UE 210 and a list of services terminated by the UE 210.

In operation S445, the eNB 220 may transmit, to the MCE 230, an MBMS selected services information message through the M2AP 322. The MCE 230 may receive the MBMS selected services information message.

The MBMS selected services information message may include the changed MBMS selected services information.

In operation S450, the MCE 230 may increase or decrease counting information associated with UEs 210 that receive a corresponding service from the eNB 220 through or based on the received MBMS selected services information message.

In operation S460, the RRC connection state of the UE 210 may be changed to an RRC-idle state.

In operation S470, the UE 210 that is in the RRC-idle state may select or terminate a service that requires MBMS counting. Accordingly, the UE 210 in the RRC-idle state may select or terminate the service requiring the MBMS counting so as to change the MBMS selected services information.

In operation S480, the UE 210 may transmit an RRC connection request message of a common control channel (CCCH) to the eNB 220, and may maintain an RRC connection state to be the RRC-idle state. That is, the UE 210 may generate a new signaling bearer and may change the RRC connections state to an RRC-connected state and thus, may not transmit a message.

The RRC connection request message may include a list of services selected by the UE 210 and a list of services terminated by the UE 210.

The RRC connection request message may include the changed MBMS selected services information, and the changed MBMS selected services information may include the list of services selected by the UE 210 and the list of services terminated by the UE 210.

The RRC connection request message may set a cause for establishment as reception for MBMS service, so that the eNB 220 does not set an RRC connection.

The eNB 220 may receive the RRC connection request message.

That is, in terms of reception of an MBSFN-based MBMS service, when a service requiring MBMS counting is received or cancelled, the UE 210 may transmit information associated with the reception or cancellation of the service to the eNB 220, irrespective of the RRC connection state.

In operation S485, the eNB 220 may transmit an MBMS selected services information message, to the MCE 230 through the M2AP 322. The MCE 230 may receive the MBMS selected services information message.

The MBMS selected services information message may include the changed MBMS selected services information.

In operation S490, the MCE 403 may increase or decrease counting information associated with the UEs 210 that receive a corresponding service from the eNB 220, through or based on the received MBMS selected services information message.

Based on the operations S405 through S490 described in the foregoing, the MCE 230 may count a number of the UEs 210 that receive a service requiring MBMS counting for each eNB 220, irrespective of an RRC connection state of a corresponding UE 210.

The MCE 230 may control whether to continuously provide a corresponding service or may control point-to-point transmission switching of a corresponding service. Accordingly, wireless resources may be utilized efficiently.

Exemplary embodiments described with reference to FIGS. 1 through 3 will be applicable to this exemplary embodiment and thus, detailed descriptions will be omitted for conciseness.

Figure 5:
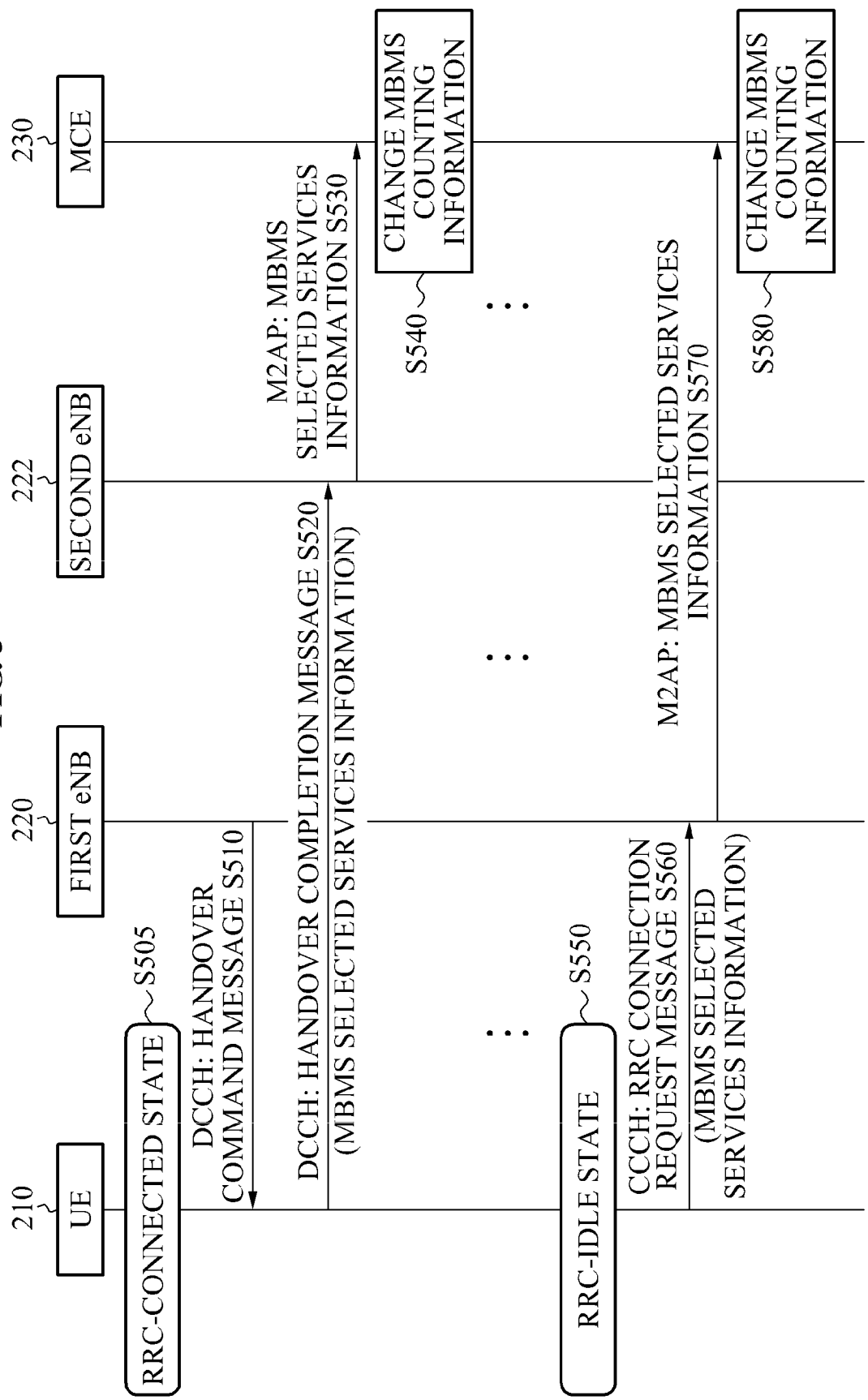
FIG. 5 is a flowchart illustrating an MBMS counting method when a UE moves to a new cell according to an embodiment of the present invention.

FIG. 5 illustrates an MBMS counting method when the UE 210 moves to a new cell according to an embodiment of the present invention.

The UE 210 may be able to move to a new cell through handover while being in an RRC-connected state, and the UE 210 may be able to move to a new cell through cell reselection while being in an RRC-idle state.

In an MBSFN, when the UE 210 moves, the moving UE 210 is capable of continuously receiving a service without an additional process, but may need an additional process to perform MBMS counting.

In operation S505, the UE 210 may receive an MBMS service from a first eNB 220. An RRC connection state of the UE 210 may be an RRC-connected state.

In operation S510, the first eNB 220 may determine that handover of the UE 210 to a second eNB 222 is required due to movement of the UE 210. The first eNB 220 may be a source eNB, and the second eNB 222 may be a target eNB.

The first eNB 220 may transmit a handover command message of a DCCH to the UE 210. The UE 210 may receive the handover command message from the first eNB 220.

In operation S520, the UE 210 may establish a connection with the second eNB 222. That is, the connection between the UE 210 and the second eNB 222 may be established.

The UE 210 may transmit a handover completion message of the DCCH to the second eNB 222.

When a service requiring MBMS counting is included in a service being received by the UE 210, the UE 210 may transmit information associated with the service that the UE 210 is currently receiving, by including the information in the handover completion message, for MBMS counting. The handover completion message may include MBMS selected services information corresponding to a list of MBMS services being received by the UE 210.

The second eNB 222 may receive the handover completion message from the UE 210.

In operation S530, when the received handover completion message includes the MBMS selected services information, the second eNB 222 may extract the MBMS selected services information from the handover completion message.

The second eNB 222 may include information associated with a previous eNB, that is, a first eNB indicator, in the extracted MBMS selected services information.

The second eNB 222 may transmit an MBMS selected services information message to the MCE 230 through the M2AP 322. The MCE 230 may receive the MBMS selected services information message from the second eNB 222.

The MBMS selected services information message may include changed MBMS selected services information.

In operation S540, when the information associated with the previous eNB, that is, information associated with the first eNB 220, is included in the received MBMS selected services information, the MCE 230 may manage MBMS counting information by decreasing MBMS counting information associated with the first eNB 220, and increasing MBMS counting information associated with the second eNB 222.

In operation S550, the UE 210 may receive an MBMS service from the second eNB 222, and an RRC connection state of the UE 210 may be an RRC-idle state.

In operation S560, the UE 210 that receives an MBMS service and is in the RRC-idle state may move and enter a new cell of the first eNB 220. Accordingly, the UE 210 may perform cell reselection and thus, the UE 210 may continuously receive the MBMS service from the first eNB 220 through the cell reselection.

The UE 210 may not have a connection with an eNB, for example the first eNB 220 and the second eNB 222. Therefore, the UE 210 may transmit an RRC connection request message of a CCCH to the first eNB 220, and maintain the RRC-idle state.

That is, the UE 210 may generate a new signaling bearer for MBMS counting, and may change the RRC-idle state to an RRC-connected state so as not to transmit a message.

The RRC connection request message may include a list of MBMS services being received by the UE 210 and information associated with a previous eNB, that is, a second eNB indicator. That is, the RRC connection request message may include MBMS selected services information corresponding to the list of MBMS services being received by the UE 210.

The RRC connection request message may set a cause for establishment as reception of an MBMS and thus, the first eNB 220 does not set an RRC connection.

The first eNB 220 may receive the RRC connection request message from the UE 210.

In terms of reception of an MBSFN-based MBMS service, when the UE 210 moves to a new cell, the UE 210 may transmit information associated with an MBMS service being currently received by the UE 210, to an eNB, for example, the eNB 220 or the eNB 222.

In operation S570, the first eNB 220 may transmit an MBMS selected services information message to the MCE 230 through the M2AP 322.

The MBMS selected services information message may include changed MBMS selected services information.

The MCE 230 may receive the MBMS selected services information message from the eNB 220.

The MCE 230 may manage MBMS counting information based on the MBMS selected services information.

When information associated with a previous eNB, for example, the second eNB 222, is included in the received MBMS selected services information message, the MCE 230 may manage the MBMS counting information by decreasing MBMS counting information associated with the previous eNB, that is, the second eNB 222, and increasing MBMS counting information associated with a new eNB, that is, the first eNB 220.

Based on the method including operations S505 through S580, the MCE 230 may count a number of UEs 210 that receive a service requiring MBMS counting for each eNB, irrespective of an RRC connection state of a corresponding UE 210, although the UE 210 moves to a new eNB.

Through the counting, the MCE 230 may control whether to continuously provide a corresponding service or may control point-to-point transmission switching of a corresponding service. Therefore, wireless resources may be utilized efficiently.

The MCE 230 may convert, to an MBMS reserved cell, a cell that does not include an UE 210 that receives an MBMS service, based on counting information associated with the first eNB 220 and counting information associated with the second eNB 222. The cell converted to the MBMS reserved cell may change a service provided by the cell.

Exemplary embodiments described with reference to FIGS. 1 through 4 may be applicable to this exemplary embodiment and thus, detailed descriptions thereof will be omitted for conciseness.

When the MBSFN-based MBMS service is provided, a network may count services requiring MBMS counting without transmitting an additional message, irrespective of an RRC connection state of the UE 210 and movement of the UE 210. The network may control whether to continuously provide a corresponding service or may control whether to switch a corresponding service to point-to-point transmission. Therefore, wireless resources may be utilized effectively.

Also, the UE 210 may transmit counting information to the network every time a service requiring MBMS counting is selected or cancelled, and every time that the UE 210 moves to a new eNB. Accordingly, the MBMS counting may be managed in real-time. A temporary increase in load of the network may be overcome by transmitting an additional MBMS counting message.

The term of "MBSFN-based" may be replaced with a term "multi-cell-based", a term "a single frequency network-based", and the like.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of a user equipment (UE) for providing, to a base station, multimedia broadcast and multicast service (MBMS) counting information, the method comprising:
    (a) receiving, from the base station, a multimedia broadcast and multicast service single frequency network (MBSFN) area configuration message;
    (b) changing MBMS selected services information during a radio resource control (RRC)-connected state, by selecting or terminating a first service requiring MBMS counting;
    (c) transmitting, to the base station, an MBMS modification request message including a first list of selected services and a second list of terminated services;
    (d) changing an RRC connection state from the RRC-connected state to an RRC-idle state;
    (e) changing the MBMS selected services information during the RRC-idle state, by selecting or terminating a second service requiring MBMS counting; and
    (f) transmitting, to the base station, an RRC connection request message including a third list of selected services and a fourth list of terminated services.

2. The method of claim 1, wherein the MBSFN area configuration message is a message of a multicast control channel, the MBMS modification request message is a message of a dedicated control channel (DCCH), and the RRC connection request message is a message of a common control channel (CCCH).

3. The method of claim 1, wherein the RRC connection request message sets a cause for establishment as a reception of an MBMS.

4. The method of claim 1, wherein the first service requiring the MBMS counting and the second service requiring the MBMS counting are identified based on the MBSFN area configuration message.

5. The method of claim 1, wherein the first list, the second list, the third list, and the fourth list are included in the MBMS selected services information, and transmitted.

* * * * *